(12) United States Patent
Fujita et al.

(10) Patent No.: US 10,586,421 B2
(45) Date of Patent: Mar. 10, 2020

(54) DISPLAY DEVICE AND GAME MACHINE

(71) Applicant: OMRON Corporation, Kyoto-shi, Kyoto (JP)

(72) Inventors: Junya Fujita, Ichinomiya (JP); Yoshihiko Takagi, Kyoto (JP); Jun Kishimoto, Ogaki (JP); Masaaki Hiramatsu, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 14 days.

(21) Appl. No.: 15/896,120

(22) Filed: Feb. 14, 2018

(65) Prior Publication Data

US 2018/0182201 A1   Jun. 28, 2018

Related U.S. Application Data

(63) Continuation of application No. PCT/JP2016/083863, filed on Nov. 15, 2016.

(30) Foreign Application Priority Data

Dec. 9, 2015 (JP) ................................. 2015-240284

(51) Int. Cl.
*G07F 17/32* (2006.01)
*G09F 13/00* (2006.01)
(Continued)

(52) U.S. Cl.
CPC .......... *G07F 17/3211* (2013.01); *G02B 6/006* (2013.01); *G02B 6/0016* (2013.01);
(Continued)

(58) Field of Classification Search
CPC ...... G07F 17/32; G07F 17/3211; G09F 13/18; G02B 6/0016; G02B 6/0033; G02B 6/0036
See application file for complete search history.

(56) References Cited

U.S. PATENT DOCUMENTS 7,295,263 B2 * 11/2007 Shiraishi .............. G02B 6/0043
349/65
7,478,942 B2 * 1/2009 Kim ..................... G02B 6/0036
349/65
(Continued)

FOREIGN PATENT DOCUMENTS

CN    201319242 Y    9/2009
CN    101681034 A    3/2010
(Continued)

OTHER PUBLICATIONS

An English translation of the International Search Report of PCT/JP2016/083863 dated Feb. 21, 2017.
(Continued)

*Primary Examiner* — Chase E Leichliter
(74) *Attorney, Agent, or Firm* — Metrolex IP Law Group, PLLC

(57) ABSTRACT

A light guide plate presents a plurality of patterns via prisms illuminated by light sources aligned along one sidewall of the light guide plate. Each light source corresponds to a different pattern. A storage unit stores lighting sequence information and a controller controls the turning on and off of the plurality of light sources in accordance with the lighting sequence information, thereby illuminating the patterns. Visible light emitted from the light sources to enters the light guide plate via an incidence surface. The prisms making up the patterns reflect only the visible light emitted from a light source corresponding to a particular pattern.

7 Claims, 13 Drawing Sheets

(51) Int. Cl.
*G09F 13/18* (2006.01)
*F21V 8/00* (2006.01)
*G02F 1/1335* (2006.01)
*H05B 33/08* (2020.01)
*F21W 121/00* (2006.01)
*A63F 7/02* (2006.01)

(52) U.S. Cl.
CPC ..... *G02B 6/0068* (2013.01); *G02F 1/133602* (2013.01); *G09F 13/00* (2013.01); *G09F 13/18* (2013.01); *H05B 33/0842* (2013.01); *A63F 7/022* (2013.01); *F21W 2121/00* (2013.01); *G02B 6/0036* (2013.01)

(56) References Cited

U.S. PATENT DOCUMENTS

| | | | | |
|---|---|---|---|---|
| 9,201,188 | B2* | 12/2015 | Kim | G02B 6/0036 |
| 2004/0022050 | A1* | 2/2004 | Yamashita | G02B 6/0021 |
| | | | | 362/615 |
| 2004/0052078 | A1* | 3/2004 | Hosaka | G07F 17/3211 |
| | | | | 362/302 |
| 2004/0145915 | A1* | 7/2004 | Kim | G02B 6/0036 |
| | | | | 362/559 |
| 2004/0227286 | A1 | 11/2004 | Tanimura et al. | |
| 2005/0261057 | A1* | 11/2005 | Bleich | G07F 17/3202 |
| | | | | 463/30 |
| 2006/0083476 | A1 | 4/2006 | Winkler | |
| 2008/0207303 | A1* | 8/2008 | Rasmussen | G07F 17/3202 |
| | | | | 463/20 |
| 2009/0073721 | A1 | 3/2009 | Kamikatano et al. | |
| 2009/0286446 | A1 | 11/2009 | Kamikatano et al. | |
| 2010/0177025 | A1 | 7/2010 | Nagata et al. | |
| 2012/0013648 | A1* | 1/2012 | Yamaguchi | G02B 6/0038 |
| | | | | 345/690 |
| 2012/0206320 | A1* | 8/2012 | Lee | G07F 17/3202 |
| | | | | 345/4 |
| 2012/0206321 | A1* | 8/2012 | Lee | G02B 6/0055 |
| | | | | 345/5 |
| 2013/0051075 | A1* | 2/2013 | Fujita | G02B 6/0038 |
| | | | | 362/613 |
| 2013/0135560 | A1* | 5/2013 | Lee | G02F 1/133602 |
| | | | | 349/65 |
| 2013/0252709 | A1* | 9/2013 | Lee | G02F 1/133615 |
| | | | | 463/20 |
| 2015/0092444 | A1 | 4/2015 | Takagi et al. | |
| 2015/0235508 | A1 | 8/2015 | Shinohara et al. | |
| 2016/0018586 | A1* | 1/2016 | Chuang | G02B 6/0053 |
| | | | | 362/606 |

FOREIGN PATENT DOCUMENTS

| | | |
|---|---|---|
| CN | 102136169 A | 7/2011 |
| JP | 2003-519810 A | 6/2003 |
| JP | 2006-75362 A | 3/2006 |
| JP | 2006-184881 A | 7/2006 |
| JP | 2015-39880 A | 3/2015 |
| JP | 2015-88489 A | 5/2015 |
| JP | 2015092444 A | 5/2015 |
| JP | 2015-156317 A | 8/2015 |
| WO | 2007123202 A1 | 11/2007 |

OTHER PUBLICATIONS

An English translation of the Written Opinion of PCT/JP2016/083863 dated Feb. 21, 2017.
The (translated) Japanese Office Action (JPOA) dated Jun. 4, 2019 in a counterpart Japanese patent application.
The (translated) Chinese Office Action (CNOA) dated Jun. 5, 2019 in a counterpart Chinese patent application.

* cited by examiner

US 10,586,421 B2

DISPLAY DEVICE AND GAME MACHINE

CROSS REFERENCE TO RELATED APPLICATIONS

This application is a continuation application of International Application No. PCT/JP2016/083863, filed on Nov. 15, 2016, which claims priority based on the Article 8 of Patent Cooperation Treaty from prior Japanese Patent Application No. 2015-240284, filed on Dec. 9, 2015, the entire contents of which are incorporated herein by reference.

FIELD

The disclosure relates to a display device capable of dynamically changing patterns presented thereon, and a game machine including such a display device.

BACKGROUND

Luminaires, i.e., illumination devices have been proposed which include a panel-like light guide plate made from optically transmissive material. The illumination devices proposed causes a pattern to be shown in accordance with the direction light enters the light guide plate (for instance, Japanese Patent Publication No. 2003-519810).

The illumination device disclosed in JP 2003-519810A includes an optically transmissive panel. The panel is arranged between a light output window, and a rear wall facing the light output window, and includes optically transmissive first and second end surfaces that are arranged at mutually different locations. Light entering the panel from a light source facing the first end surface is reflected by the plurality of rectangular prisms aligned along a first light symbol formed on the rear wall. The light then exits from a light output surface causing a first light symbol to be shown. Light entering the panel from a light source facing the second end surface is reflected by the plurality of rectangular prisms aligned along a second light symbol formed on the rear wall. The light then exits from a light output surface causing a second light symbol to be shown. Alternating which light source is turned on in this illumination device changes the pattern presented.

TECHNICAL PROBLEM

As above described, the pattern displayed may be changed by alternating the light source that is turned on in the illumination device disclosed in JP 2003-519810A. However, it may be desirable to provide a greater assortment of display patterns depending on the purpose of the display device.

Therefore, the present invention provides a light guide plate that allows dynamic switching of the patterns presented in accordance with the light source that is turned on from among a plurality of light sources.

SUMMARY

One embodiment provides a display device. A display device includes: a light guide plate formed from a panel transparent to visible light, the light guide configured to present a plurality of patterns; a plurality of light sources aligned along one sidewall of the light guide plate with each light source corresponding to a pattern among the plurality of patterns; a storage unit configured to store lighting sequence information that specifies the sequence for turning on the plurality of light sources; and a controller configured to control the turning on and off of the plurality of light sources in accordance with the lighting sequence information; and the light guide plate including: an incidence surface configured as the sidewall facing the plurality of light sources to allow visible light emitted from the light sources to enter the light guide plate; and for each of the plurality of patterns, a plurality of prisms arranged in the pattern on one surface of the light guide plate, the plurality of prisms configured to reflect the visible light emitted from a light source corresponding to the pattern and entering the light guide plate from the incidence surface toward the other surface of the light guide plate.

In the display device each of the prisms in a plurality of first prisms forming a first pattern among the plurality of patterns include a reflection surface oriented facing a first light source from the plurality of light sources that corresponds to the first pattern and each of the prisms in a plurality of second prisms forming a second pattern among the plurality of patterns include a reflection surface oriented facing a second light source from the plurality of light sources that corresponds to the second pattern.

In the display device, it may be preferable that the lighting sequence information specifies the sequence for turning on a plurality of light sources so that the number of light sources simultaneously illuminated changes as time passes; and the controller changes the number of light sources simultaneously turned on in accordance with the passage of time according to the lighting sequence information.

Alternatively, in the display device, the plurality of light sources may include a first light source that corresponds to a first pattern among the plurality of patterns and a second light source that corresponds to a second pattern among the plurality of patterns; and said plurality of prisms includes a plurality of first prisms forming the first pattern and reflecting the visible light from the first light source toward the other surface; and a plurality of second prisms forming the second pattern and reflecting the visible light from the second light source toward the other surface; and the plurality of light sources may include a third light source that corresponds to a third pattern among the plurality of patterns and is adjacent to the second pattern; and said plurality of second prisms forming the second pattern reflects the visible light second light source and visible light from the third light source toward the other surface.

In this case, the lighting sequence information specifies that the first light source, the second light source, and the third light source are turned on in that order.

Another embodiment provides a game machine. The game machine includes: a main game unit; and a display device provided on the surface of the main game unit facing a player; the display device including: a light guide plate formed from a panel transparent to visible light, the light guide plate configured to present a plurality of patterns; a plurality of light sources aligned along one side wall of the light guide plate with each light source corresponding to a pattern among the plurality of patterns; a storage unit configured to store lighting sequence information that specifies the sequence for turning on the plurality of light sources; and a controller configured to control the turning on and off of the plurality of light sources in accordance with the lighting sequence information; and the light guide plate including: an incidence surface configured as the sidewall facing the plurality of light sources to allow visible light emitted from the light sources to enter the light guide plate; and for each of the plurality of patterns, a plurality of prisms arranged in the pattern on one surface of the light guide plate, the plurality of prisms configured to reflect the visible light emitted from a light source corresponding to the pattern and entering the light guide plate from the incidence surface toward the other surface of the light guide plate.

Effects

A display device according to one or more embodiments allows dynamic switching of patterns presented in accordance with the light source that is turned on from among a plurality of light sources.

DETAILED DESCRIPTION

A display device according to one or more embodiments is described below with reference to the drawings. The display device includes a light guide plate formed from a panel that is transparent in visible light; one surface of the light guide plate faces the observer and is taken as the emission surface. One of the sidewalls surrounding the emission surface of the light guide plate serves as the incidence surface with a plurality of light sources aligned along and facing the incidence surface. A plurality of prisms are created on the other surface of the light guide plate facing the emission surface; the plurality of prisms reflect the visible light emitted from the light source and entering the light guide plate toward the emission surface. The plurality of prisms is grouped to correspond to the plurality of light sources. Each group of prisms is arranged to coincide with the pattern shown by the display device. The groups of prisms are further arranged so that the reflection surface of the prisms in the group directly faces the light source to which the group corresponds. A controller makes it possible to present a dynamically changing pattern, similar to an animation, by switching the light sources that are illuminated in accordance with lighting sequence information that represents the sequence in which the light sources are turned on.

In the description that follows, the side of the light guide plate facing the observer is assumed to be the front surface, and the opposite surface taken as the rear surface.

Figure 1:
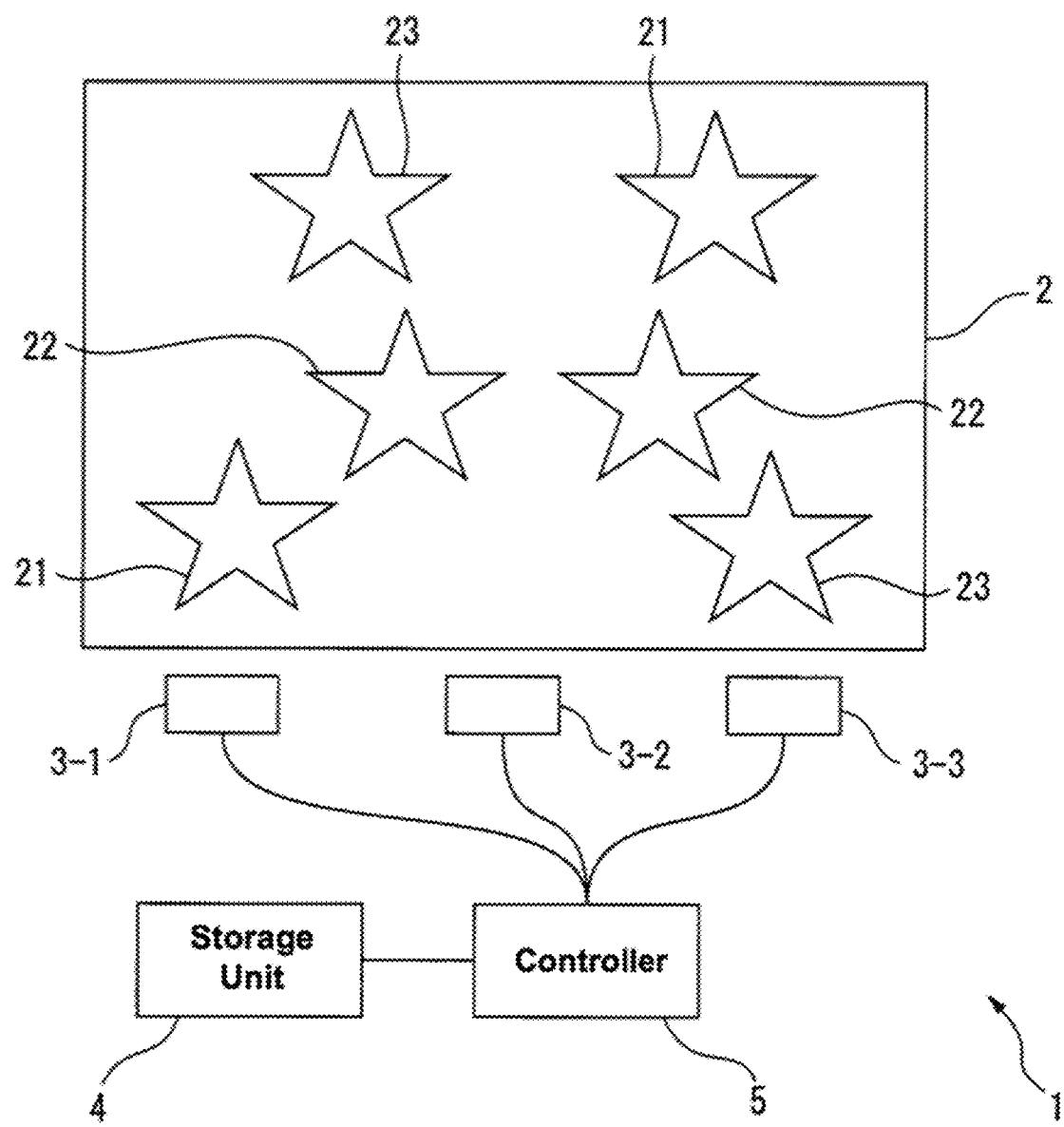
FIG. 1 is a schematic view illustrating a configuration of a display device according to one or more embodiments.

FIG. 1 is a schematic view illustrating a configuration of a display device according to one or more embodiments. The display device 1 includes a light guide plate 2, three light sources 3-1 . . . 3-3, a storage unit 4, and a controller 5. Note that the number of light sources included in the display device is not limited; the display device may have two, or four or more light sources.

The light guide plate 2 is produced from a panel like material that is transparent with respect to the visible light emitted from the light sources 3-1, . . . , 3-3. For instance, the light guide plate 2 may be molded from a visible-light-transparent resin of poly methyl methacrylate (PMMA), a polycarbonate, or a cycloolefin polymer. The light guide plate 2 includes three patterns 21-23 which may be presented depending on which of the light sources 3-1 . . . 3-3 is illuminated. That is, a plurality of prisms is created on the rear surface of the light guide plate 2 and arranged corresponding to the light source 3-1 to produce a predetermined pattern 21. When the light source 3-1 is lit, the plurality of prisms propagate the light from the light source 3-1 through the light guide plate 2 and toward the observer located in front of the light guide plate 2; hereby the emission of the predetermined pattern 21 is visible to the observer. Similarly, a plurality of prisms is created on the rear surface of the light guide plate 2 and arranged corresponding to the light source 3-2 to produce a predetermined pattern 22. When the light source 3-2 is lit, the plurality of prisms propagate the light from the light source 3-2 through the light guide plate 2 and toward the observer located in front of the light guide plate 2; hereby the emission of the predetermined pattern 22 is visible to the observer. Finally, a plurality of prisms is created on the rear surface of the light guide plate 2 and arranged corresponding to the light source 3-3 to produce a predetermined pattern 23. When the light source 3-2 is lit, the plurality of prisms propagate the light from the light source 3-2 through the light guide plate 2 and toward the observer located in front of the light guide plate 2; hereby the emission of the predetermined pattern 23 is visible to the observer. The specifics of the light guide plate 2 are described later.

The plurality of light sources 3-1 . . . 3-3 includes at least one light emitting element capable of emitting visible light. The light emitting surface of the light emitting element is arranged facing an incidence surface 2a, which is at least one of the side walls in the light guide plate 2. The light sources 3-1 . . . 3-3 are aligned along the incidence surface 2a and disposed at mutually different locations. The controller 5 sends a control signal according to which of the light sources 3-1 . . . 3-3 is to turn on or off. When the controller 5 illuminates the light source 3-1, the light emitted from the light source 3-1 enters the light guide plate 2 via the incidence surface 2a, travels through the light guide plate 2, is reflected at the plurality of prisms created in the pattern 21 on the diffusion surface 2*b* at the rear surface of the light guide plate 2, and then exits from the emission surface 2*c* toward the front surface. Similarly, when the controller 5 illuminates the light source 3-2, the light emitted from the light source 3-2 enters the light guide plate 2 via the incidence surface 2*a*, travels through the light guide plate 2, is reflected at the plurality of prisms created in the pattern 22 on the diffusion surface 2*b* at the rear surface of the light guide plate 2, and then exits from the emission surface 2*c* toward the front surface. Finally, when the controller 5 illuminates the light source 3-3, the light emitted from the light source 3-3 enters the light guide plate 2 via the incidence surface 2*a*, travels through the light guide plate 2, is reflected at the plurality of prisms created in the pattern 23 on the diffusion surface 2*b* at the rear surface of the light guide plate 2, and then exits from the emission surface 2*c* toward the front surface.

Note that the light emitting element in the light sources 3-1 . . . 3-3 may be a light emitting diode, and incandescent light, or a fluorescent light. The colors emitted by the light sources 3-1 . . . 3-3 do not need to be identical and may be different from each other. The brightness of the light sources 3-1 . . . 3-3 need not be identical and may be different.

The storage unit 4 may include for instance, a volatile or non-volatile memory circuit. The storage unit 4 stores the lighting sequence information that represents the order in which the light sources 3-1 . . . 3-3 are lit.

The controller 5 may include a processor and a drive circuit for the light sources 3-1 . . . 3-3. The controller 5 controls the turning on and off of the light sources 3-1 . . . 3-3 according to the lighting sequence information. Note that the specifics of how the controller 5 controls the lighting of the light sources 3-1 . . . 3-3 is described later.

The specifics of the light guide plate 2 are described below.

Figure 2:
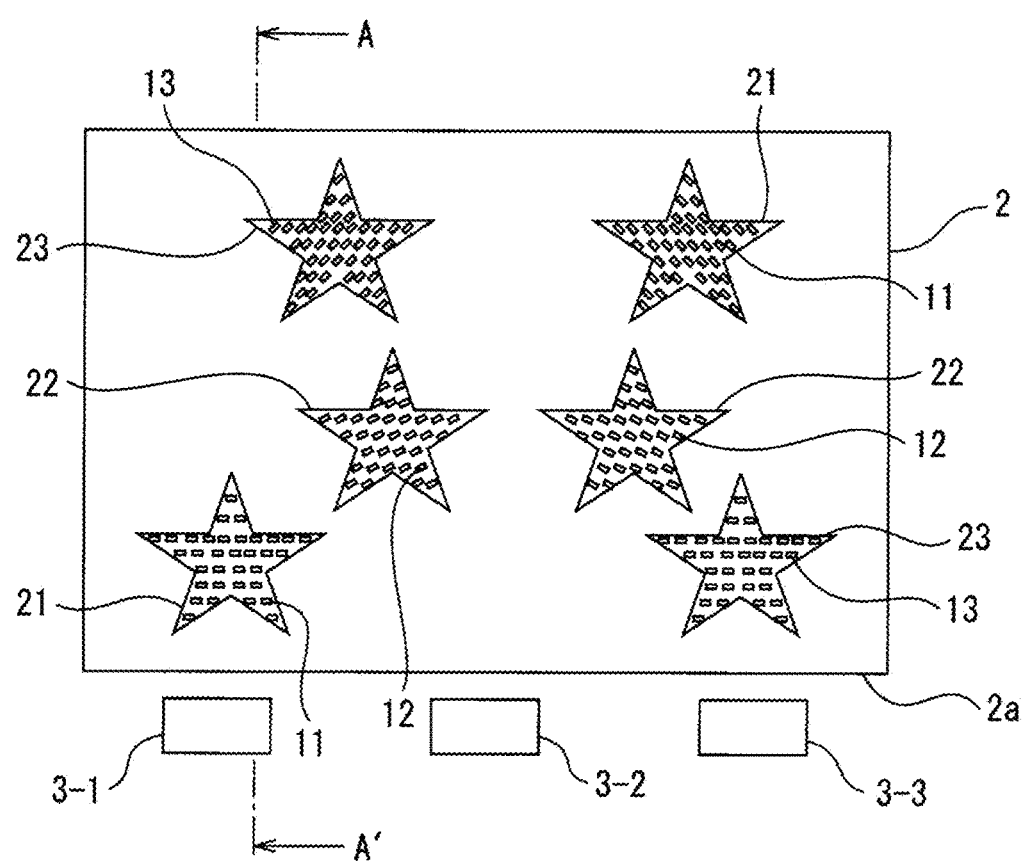
FIG. 2 is a schematic front view illustrating a light guide plate in a display device.
Figure 3:
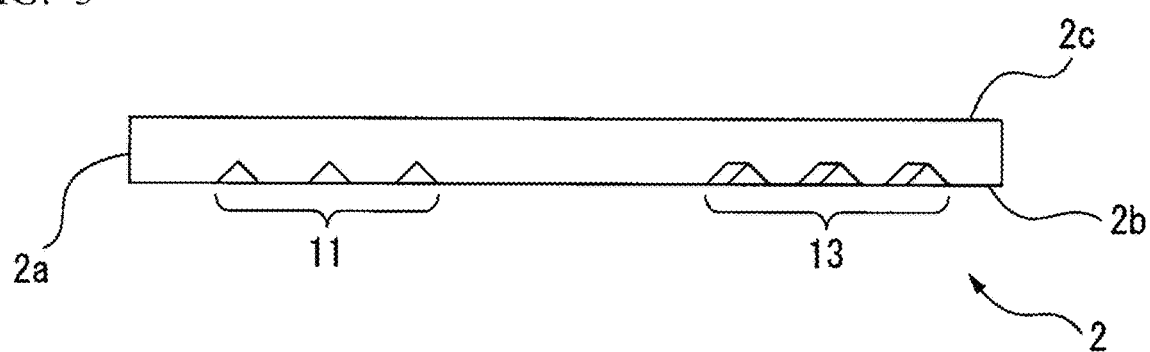
FIG. 3 is a diagram illustrating a schematic lateral cross-sectional view of a light guide plate, such as along the line A-A' in FIG. 2.

FIG. 2 is a schematic front view of the light guide plate 2. FIG. 3 is a schematic lateral cross-sectional view of the light guide plate along the line A-A' in FIG. 2. As illustrated in FIG. 2 and FIG. 3, the incidence surface 2*a* is formed on one sidewall surface of the light guide plate 2 facing the light sources 3-1 . . . 3-3. Light from the light sources 3-1 . . . 3-3 enters the light guide plate 2 from the incidence surface 2*a*. The light from the light sources 3-1 . . . 3-3 and propagating in the light guide plate 2 is totally reflected by the plurality of prisms 11 formed on the diffusion surface 2*b* located on the rear surface of the light guide plate 2. Thereafter, this light exits from the emission surface 2*c* that is located on the front surface of the light guide plate 2 opposite the diffusion surface 2*b*. The plurality of prisms 11 is arranged to coincide with the pattern 21 to produce the pattern 21. Consequently, an observer will be able to see the illuminated pattern 22 at the front surface of the light guide plate 2 while the light source 3-1 is illuminated. The sizes of the prisms, and the thickness of the light guide plate 2 are exaggerated in FIG. 2 and FIG. 3 for illustrative purposes.

Similarly, light from the light source 3-2 enters the light guide plate 2 from the incidence surface 2*a* and propagates through the light guide plate 2; this light is totally reflected by the plurality of prisms 12 formed on the diffusion surface 2*b* and exits the light guide plate from the emission surface 2*c*. The plurality of prisms 12 is arranged to coincide with the pattern 22 to produce the pattern 22. Consequently, an observer will be able to see the illuminated pattern 22 at the front surface of the light guide plate 2 while the light source 3-2 is illuminated.

Finally, light from the light source 3-3 enters the light guide plate 2 from the incidence surface 2*a* and propagates through the light guide plate 2; this light is totally reflected by the plurality of prisms 13 formed on the diffusion surface 2*b* and exits the light guide plate from the emission surface 2*c*. The plurality of prisms 13 is arranged to coincide with the pattern 23 to produce the pattern 23. Consequently, an observer will be able to see the illuminated pattern 23 at the front surface of the light guide plate 2 while the light source 3-3 is illuminated.

The prisms 11 through the prisms 13 are produced identically and only differ in orientation and arrangement. The prisms 11 are described below.

Each of the prisms 11 may be formed in the diffusion surface 2*b*, for example, as roughly triangular grooves of a predetermined length. Each of the prisms 11 includes a reflection surface 11*a* that forms a predetermined angle with the diffusion surface 2*b*. This predetermined angle is established so that light from the light source 3-1 entering the light guide plate 2 is totally internally reflected and travels toward the emission surface 2*c*; for instance, this angle may be 40° to 50° relative to the diffusion surface 2*b*. The predetermined length is long enough to allow the plurality of prisms to be arranged within the pattern 21; for example, the predetermined length may be 100 μm to several millimeters.

Figure 4:
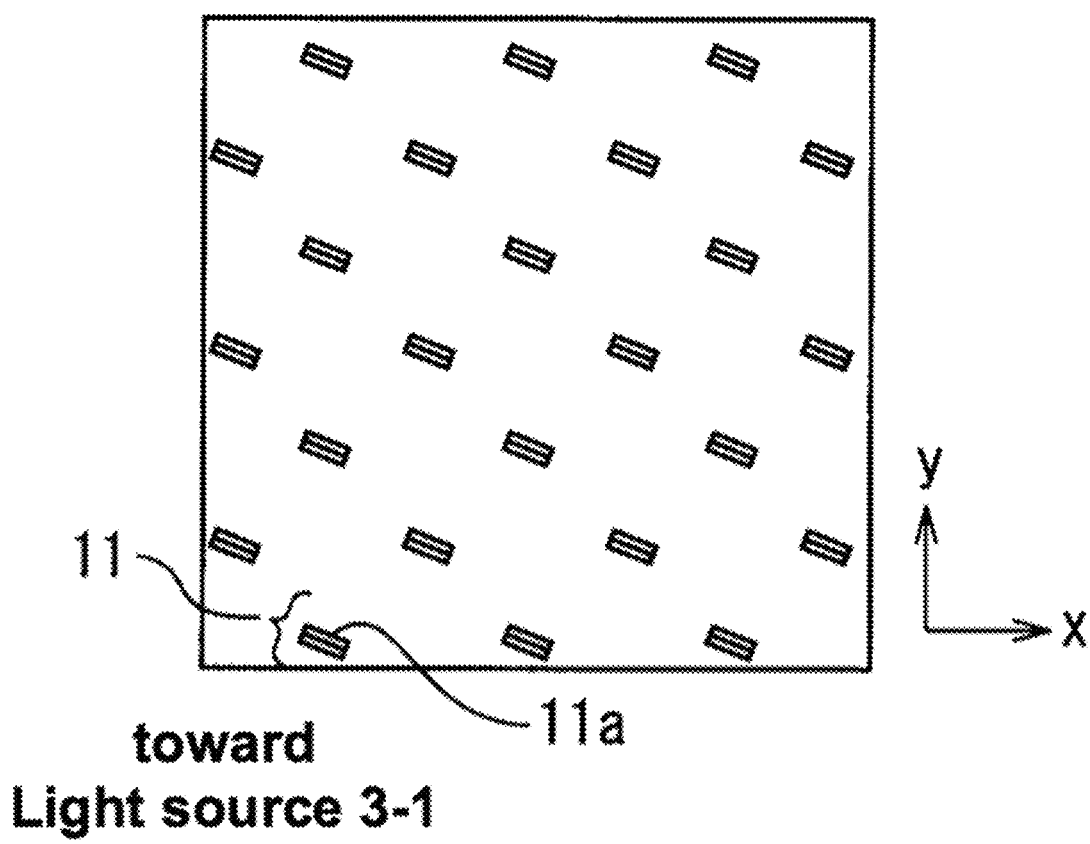
FIG. 4 is a partially enlarged plan view of a pattern illustrating the distribution of prisms.

FIG. 4 is a partially enlarged plan view of the pattern 21 to illustrate the distribution of the prisms 21; here, the upper right portion of the pattern 21 is depicted. The plurality of prisms 11 is staggered within the pattern 21. That is, within the pattern 21, the plurality of prisms 11 are disposed at equal intervals along a direction parallel to the incidence surface 2*a* of the light guide plate 2 (for brevity, referred to as the x direction), and disposed at a predetermined pitch along a line orthogonal to the incidence surface 2*a* (for brevity, referred to as the y direction). Further the position of two prisms 11 next to each other in adjacent rows are offset in the y direction. Rows of prisms 11 are positioned so that two prisms 11 adjacent to each other are offset by half the pitch. Each of the prisms 11 is arranged so that the reflection surface 11*a* thereof directly faces the light source 3-1 in a plane parallel to the diffusion surface 2*b*. That is, in one or more embodiments, the reflection surface 11*a* of a prism 11 positioned a predetermined distance away from the light source 3-1 is centered about the light source 3-1 and oriented substantially parallel to a circle whose radius is said predetermined distance.

Therefore, arranging the plurality of prisms 11 in this manner allows each of the prisms 11 to reflect light from the light source 3-1 that is entering the light guide plate via the incidence surface 2*a* in a direction roughly perpendicular to the emission surface 2*c*. In contrast, light other than light from light source 3-1 entering the incidence surface 2*a*, e.g., light from the light source 3-2 or stray light, forms a relatively large angle with the emission surface 2*c* and exits therefrom. Therefore, this light is hardly visible to an observer in front of the light guide plate 2, even if the light were reflected from the prisms 11. As a result, the display device 1 is able to present an observer with the pattern 21 only while the light source 3-1 is turned on.

The plurality of prisms 12 is similarly staggered within the pattern 22. Each of the prisms 12 is arranged so that the reflection surface thereof directly faces the light source 3-2 in a plane parallel to the diffusion surface 2*b*. Therefore, in one or more embodiments, the reflection surface of a prism 12 positioned a predetermined distance away from the light source 3-2 is centered about the light source 3-2 and oriented substantially parallel to a circle whose radius is said predetermined distance. The plurality of prisms 13 is also staggered within the pattern 23. Each of the prisms 13 is arranged so that the reflection surface thereof directly faces the light source 3-3 in a plane parallel to the diffusion surface 2b. Therefore, in one or more embodiments, the reflection surface of a prism 13 positioned a predetermined distance away from the light source 3-3 is centered about the light source 3-3 and oriented substantially parallel to a circle whose radius is said predetermined distance.

Therefore, arranging the plurality of prisms 12 and the plurality of prisms 13 in this manner allows each of the prisms 12 and each of the prism 13 to reflect light from the light source and entering the light guide plate 2 via the incidence surface 2a in a direction roughly perpendicular to the emission surface 2c, similarly to the prisms 11.

The each set of prisms 11, 12, 13 may be arranged in a grid or another arrangement pattern in accordance with the corresponding pattern.

The specifics of how the controller 5 controls the lighting of the light sources 3-1 . . . 3-3 is described below. For example, to ensure that an observer located in front of the light guide plate 2 only sees the pattern 21, the controller 5 turns on the light source 3-1, and turns off the light source 3-2 and the light source 3-3. The controller 5 also turns off the light source 3-1 and the light source 3-3 while turning on the light source 3-2 to ensure that the observer only sees the pattern 22. The controller 5 also turns off the light source 3-1 and the light source 3-2 while turning on the light source 3-3 to ensure that the observer only sees the pattern 23. Finally, to ensure that the observer can see a plurality of patterns simultaneously, the controller 5 may simultaneously illuminate the light sources 3-1 . . . 3-3 that correspond to the patterns to be presented.

As above described the timing for turning the light sources 3-1 . . . 3-3 on or off is established according to lighting sequence information. The lighting sequence information may be data representing an identification code specifying the light source to be illuminated in accordance with the sequence for lighting the light sources 3-1 . . . 3-3. For example, the light source 3-1, the light source 3-2, and the light source 3-3 may be assigned identification codes '1', '2', and '3' respectively. The controller ensures that each of the light sources i.e., the light source 3-1, the light source 3-2, and the light source 3-3 is repeatedly turned on for a predetermined period in that order for each fixed cycle. In this case, the lighting sequence information may be expressed using the identification codes in order: '1'; '2'; and '3'.

Figure 5:
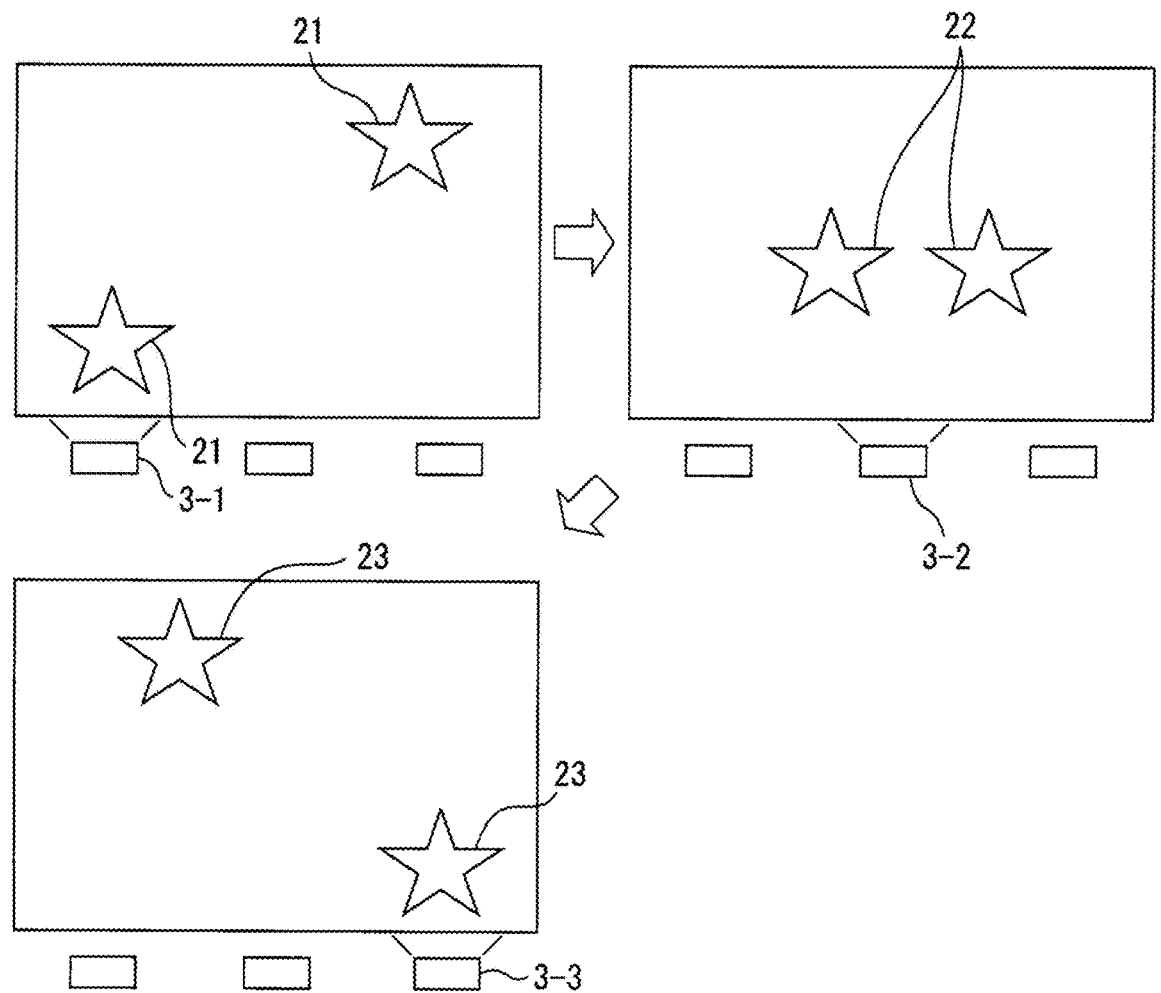
FIG. 5 is a diagram illustrating an example of the relationship between changing the illuminated light source and the change in the pattern that can be seen.

FIG. 5 illustrates an example of the relationship between changing the illuminated light source and the change that can be seen in the pattern. First, turning on the light source 3-1 presents the pattern 21. Turning on the light source 3-2 then presents the pattern 22. Finally, turning on the light source 3-3 then presents the pattern 23.

A combination of turn-on time and the identification code of the light source that should turn on at that start time can be included in the lighting sequence information each time the illuminated light source is to switch. In this case the controller 5 can turn on a plurality of light sources at the same time. The lighting sequence information may also include a combination of a turn-off time and the identification code of the light source that should turn off. This allows the display device 1 to vary the times at which to turn off a light source among a plurality of light sources that are turned on at the same time. Note that the turn-on time and the turn-off time may be the amount of time elapsed since the controller 5 turned on the light sources 3-1 . . . 3-3. Alternatively, for example, the turn-on time and the turn-off time may be the time elapsed since the start of each period the controller 5 turns on the light sources 3-1 . . . 3-3 repeatedly for a fixed period.

The controller 5 may receive a control signal including the lighting sequence information from the above mentioned control device (not shown). In this case, the controller 5 stores the lighting sequence information included in the control signal in the storage unit 4. The controller 5 may cause each of the light sources 3-1 . . . 3-3 to turn off and turn on in accordance with lighting sequence information on receiving the control signal, or at a time specified in the control signal.

As above described, the prisms are arranged in the display device among a plurality of patterns to be presented on the light guide plate; the prisms are also arranged so that the reflection surface of the prisms forming the pattern face the light source corresponding to that pattern. The controller turns on the plurality of light sources sequentially in accordance with lighting sequence information. Hereby, the display device is capable of dynamically switching the patterns presented by switching the light sources that are illuminated since the prisms forming the pattern corresponding to the illuminated light source causes the light from that light source to exit light guide plate. Moreover, the display device is also capable of modifying the sequence in which patterns are presented by substituting in the desired lighting sequence information. Therefore, the display device can implement changing between a greater assortment of display patterns. The display device may also be made thin and lightweight since no other large components are needed besides the light guide plate. Furthermore, the display device is capable of presenting the pattern shown on the light guide plate as superimposed on an object by placing another object behind the light guide plate.

In one example of modifying one or more embodiments, all or a portion of the plurality of patterns that may be displayed by the light guide plate may overlap. Some light sources may be arranged along one side of the light guide plate while other light sources are arranged along a different side of the light guide plate.

Figure 6:
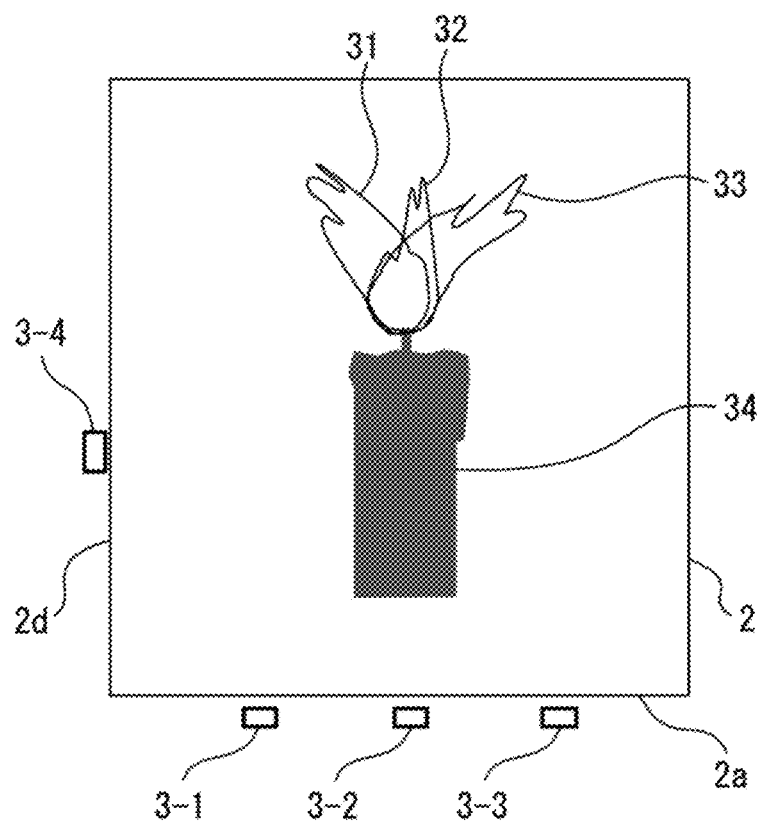
FIG. 6 is a schematic front view of a light guide plate illustrating an example of modifying the pattern on a light guide plate and the arrangement of light sources.

FIG. 6 is a schematic front view of the light guide plate, and illustrates an example of modifying the pattern on the light guide plate and the arrangement of the light sources. The patterns formed on the light guide plate and the number of light sources provided in the modification example differs from one or more embodiments. The specifics of the light guide plate and the light sources are described below.

As illustrated in FIG. 6, the modification example includes four light sources 3-1 . . . 3-4. Among the four light sources 3-1 . . . 3-4, the light sources 3-1 . . . 3-3 face the sidewall surface of the light guide plate 2 serving as the incidence surface 2a, and are aligned along the incidence surface 2a. On the other hand, the light source 3-4 faces the sidewall surface serving as an incidence surface 2d which is a sidewall surface of the light guide plate 2 orthogonal to the incidence surface 2a. Light from the light sources 3-1 . . . 3-3 enters the light guide plate 2 from the incidence surface 2a. Light from the light source 3-4 enters the light guide plate 2 from the incidence surface 2d.

Four patterns 31-34 are formed in the light guide plate 2 corresponding to the light sources 3-1 . . . 3-4. The pattern 31 presenting a lit candle corresponds to the light source 3-1. The other patterns 32, 33 presenting a lit candle correspond to the light source 3-2 and the light source 3-3 respectively. The pattern 34 presenting the candle itself corresponds to the light source 3-4. A plurality of prisms (not shown) are arranged on the rear surface of the light guide plate 2 in accordance with each of the patterns 31-34 and with the reflection surfaces thereof facing the light source corresponding the pattern. The shape and size of the prisms can be identical to the prisms described in one or more embodiments.

A portion of the patterns 31-33 overlap each other. The prisms corresponding to any of the patterns and the prisms corresponding to another pattern may be alternated in the region in which the plurality of patterns overlaps.

Figure 7:
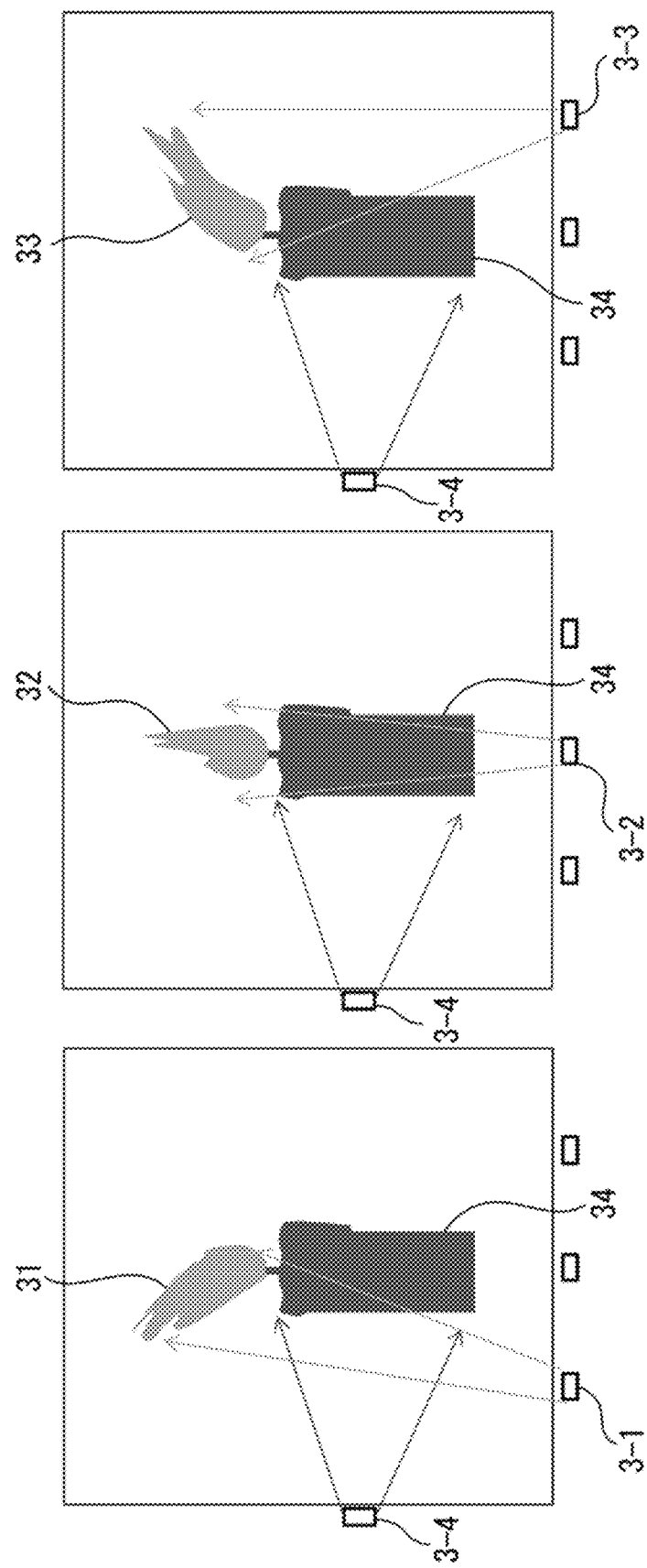
FIG. 7 is a diagram illustrating an example of the relationship between changing the illuminated light source and the change in the pattern that can be seen according to a modification example.

FIG. 7 illustrates an example of the relationship between changing the illuminated light source and the change in the pattern that can be seen according to a modification example. First, turning on the light source 3-1 and turning off the light source 3-2 and the light source 3-3 presents the pattern 31. Turning on the light source 3-2 and turning off the light source 3-1 and the light source 3-3 then presents the pattern 32. Whereas, the light source 3-4 is always lit. That is, the observer is always able to see the pattern 34. Note that the color emitted by the light sources 3-1 . . . 3-3 and the color emitted by the light source 3-4 may differ. For example, the light sources 3-1 . . . 3-3 may emit red or orange, while the light source 3-4 emits blue, green, or white.

Hereby, the display device is able to show an observer at flickering candle because the pattern of the flame on the candle, which can be seen by the observer, changes over time.

In other modification examples the controller controls turning the light sources on and off so that the number of light sources that are lit simultaneously changes over time.

Figure 8:
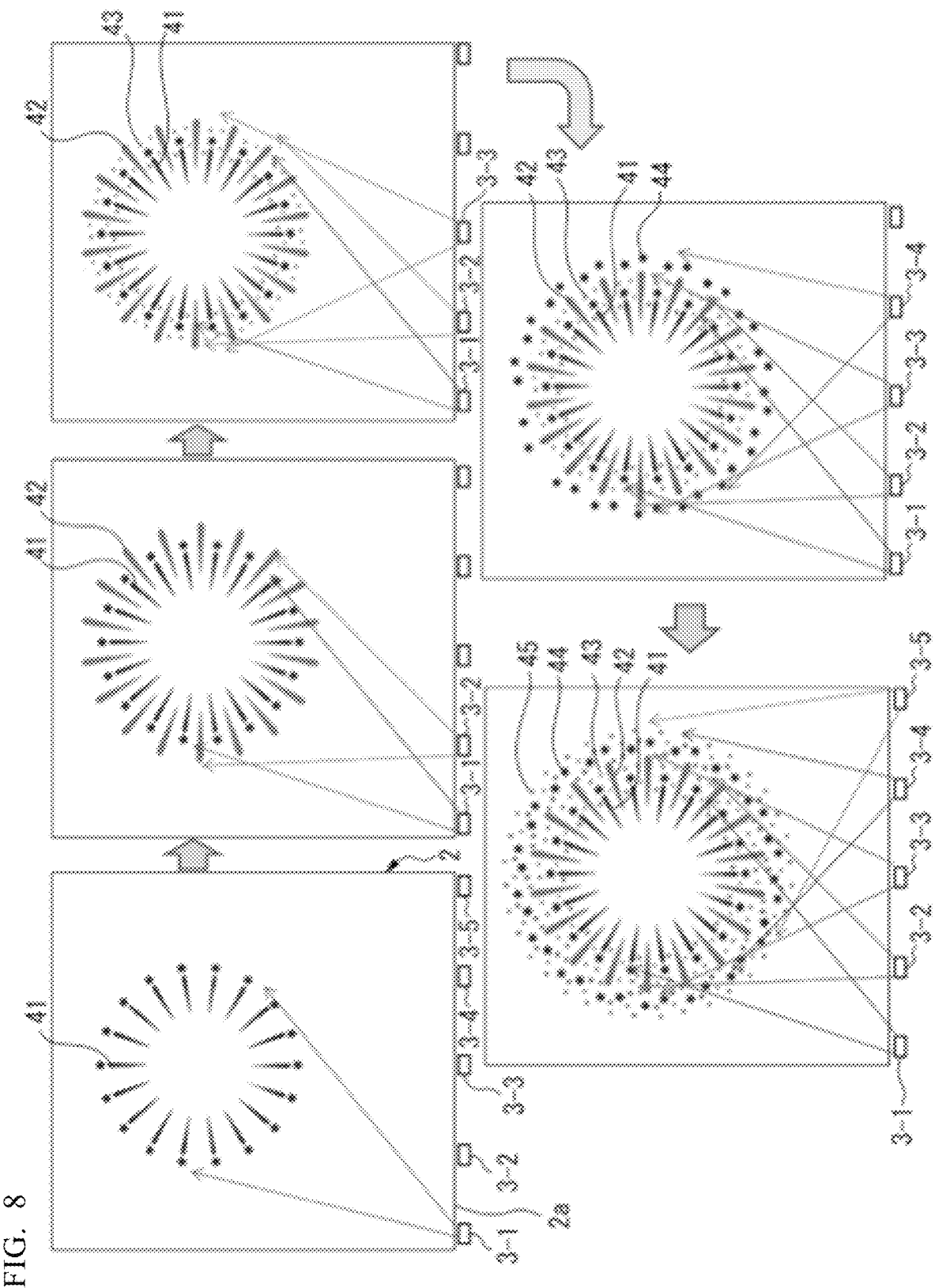
FIG. 8 is a diagram illustrating an example of the relationship between changing the illuminated light source and the change in the pattern that can be seen according to another modification example.

FIG. 8 illustrates an example of the relationship between changing the illuminated light source and the change in the pattern that can be seen according to another modification example. In FIG. 8, the arrows represent the sequence in which the light sources are turned on and the patterns are presented according to the lighting sequence information. This modification example includes five light sources 3-1 . . . 3-5. The five light sources 3-1 . . . 3-5 face the sidewall surface of the light guide plate 2 serving as the incidence surface 2a, and are aligned along the incidence surface 2a. The light sources 3-1 . . . 3-5 may emit mutually different colors or may emit the same color. For example, the light source 3-1 and the light source 3-4 may emit blue while the light source 3-2, the light source 3-3, and the light source 3-5 emit red.

Five patterns 41-45 are formed in the light guide plate 2 corresponding to the light sources 3-1 . . . 3-5. In this example, the patterns 41-45 show a portion of fireworks. A plurality of prisms (not shown) are arranged on the rear surface of the light guide plate 2 in accordance with each of the patterns 41-45 and with the reflection surfaces thereof facing the light source corresponding the pattern. The shape and size of the prisms can be identical to the prisms described in one or more embodiments.

First, the controller 5 turns on the light source 3-1 and turns off the other light sources to present the pattern 41 according to the lighting sequence information. The controller 5 then turns on the light source 3-2 in addition to the light source 3-1 and turns off the other light sources to present the pattern 41 and the pattern 42. The controller 5 thereafter turns on the light source 3-3 in addition to the light source 3-1 and the light source 3-2 and continues to keep the other light sources turned off. Thus, the patterns 41-43 are shown. The controller 5 subsequently turns on the light source 3-4 in addition to the light source 3-1 . . . 3-3 and continues to keep the light source 3-5 turned off. Thus, the patterns 41-44 are shown. Finally, the controller 5 ensures the light sources 3-1 . . . 3-5 are turned on. Hereby, a new pattern 45 is presented in addition to the patterns that were presented up to that point. That is, all the patterns 41-45 are shown.

The controller 5 may gradually reduce the number of light sources turned on from all the illuminated light sources 3-1 . . . 3-5 in accordance with the lighting sequence information. For example, the controller 5 may turn off each light source, i.e., the light source 3-1, light source 3-2, light source 3-3, light source 3-4, and light source 3-5 in that order. Alternatively, the controller 5 may turn on multiple light sources simultaneously or turn off multiple light sources simultaneously instead of simply turning on or off one light source. The controller 5 may also vary the number of light sources turned on simultaneously or the number of light sources turned off simultaneously each time light sources are turned on or turned off.

Thus, the display device allows for an assortment of changes in pattern display by changing the number and illumination period of light sources that are lit simultaneously.

In another modification example, a single light source corresponds to a plurality of patterns. That is, illuminating a single light source presents a plurality of patterns. The controller 5 illuminates the light sources chronologically so that portions of the pattern displayed appear to overlap as the pattern changes.

Figure 9:
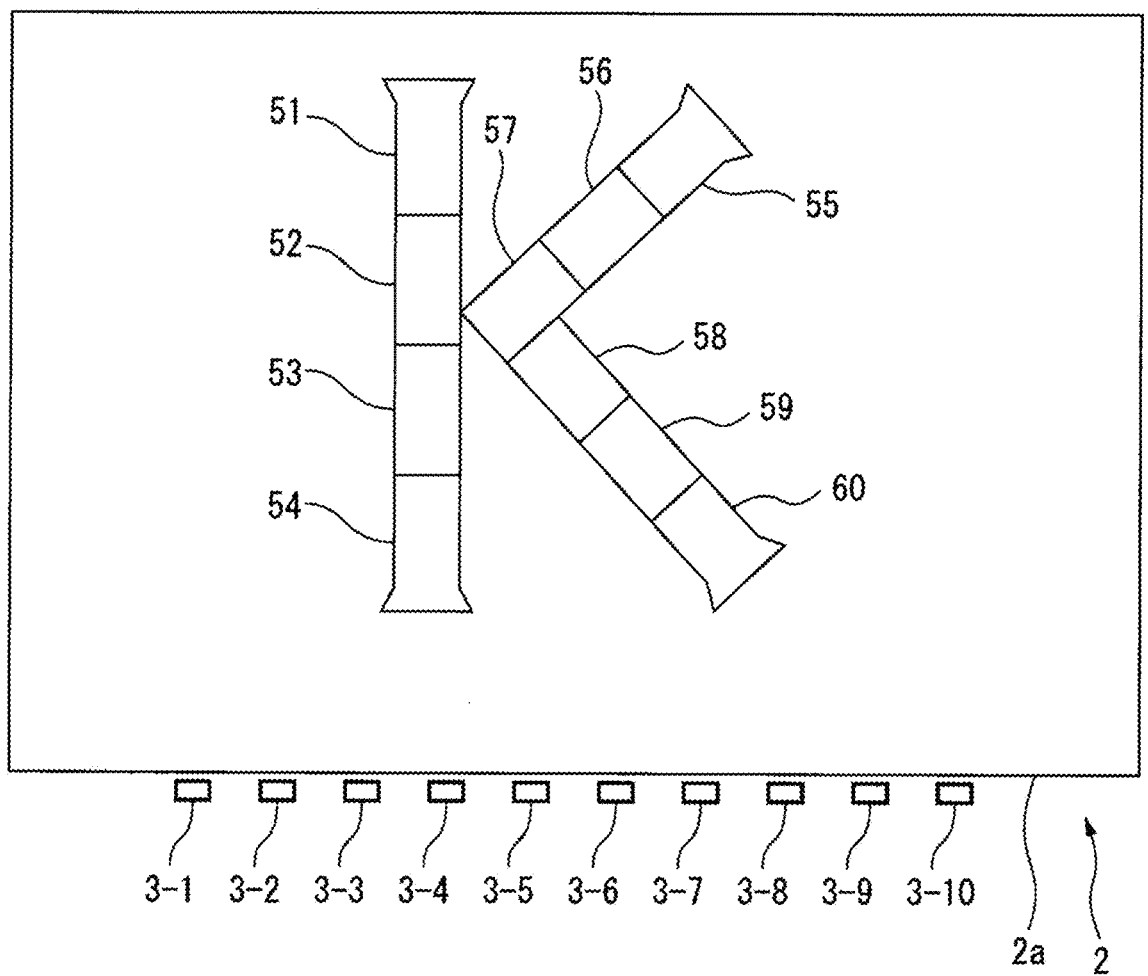
FIG. 9 is a schematic front view of a light guide plate illustrating another example of modifying the pattern on the light guide plate and the arrangement of light sources.

FIG. 9 is a schematic front view of the light guide plate, and illustrates an example of modifying the pattern on the light guide plate and the arrangement of the light sources.

As illustrated in FIG. 9, the modification example includes ten light sources 3-1 . . . 3-10. The light sources 3-1 . . . 3-10 face the sidewall surface of the light guide plate 2 serving as the incidence surface 2a, and are aligned along the incidence surface 2a. Light from the light sources 3-1 . . . 3-10 enters the light guide plate 2 from the incidence surface 2a.

Ten patterns 51-60 are formed in the light guide plate 2 corresponding to the light sources 3-1 . . . 3-10. In this example the patterns 51-60 each correspond to a portion of the letter 'K' and are arranged in the order the letter 'K' is written. The patterns 51-60 correspond to the light sources 3-1 . . . 3-10. The letter 'K' is shown in the light guide plate 2 by presenting all the patterns 51-60. A plurality of prisms (not shown) are arranged on the rear surface of the light guide plate 2 in accordance with each of the patterns 51-60 and with the reflection surfaces thereof facing the light source corresponding the pattern. The shape and size of the prisms can be identical to the prisms described in one or more embodiments.

However, given the narrow gap between two adjacent light sources in one or more embodiments, light from a single light source may appear to illuminate two patterns. For example, the angle between the light source 3-1 and the light source 3-2 seen from the pattern 52 is only about a few degrees. Therefore, light from the light source 3-1 is reflected toward the emission surface and reaches the observer via not only the prisms forming the pattern 51 but also the prisms in the pattern 52 closest to the prisms in pattern 51.

Figure 10:
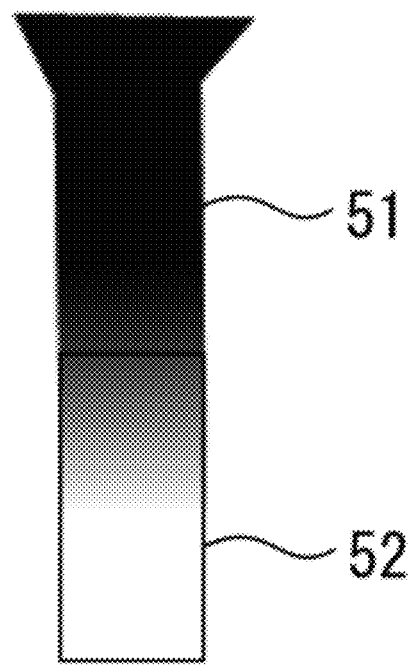
FIG. 10 is a diagram illustrating an image of a pattern presented when one of light sources is turned on in a modification example, such as in FIG. 9.

FIG. 10 depicts an image of a pattern presented when one of the light sources is turned on in the modification example illustrated in FIG. 9; note that the darker portions in FIG. 10 appear brighter. As illustrated in FIG. 10, the light source 3-1 corresponding to the pattern 51 has a substantially uniform brightness. Whereas, in this example, in the pattern 52, which is adjacent to the pattern 51, the portion thereof that is closer to the pattern 51 appears brighter. Thus, in this modification example, turning on a single light source appears to illuminate a plurality of adjacent patterns. Therefore, the controller 5 may, for instance, reference the lighting sequence information which designates the sequence in which to illuminate the light sources in the order of writing the letter 'K', and turn on the light sources 3-1 . . . 3-10 in accordance with that sequence. Hereby a portion of the pattern appears overlapped as the pattern changes. For example, when the light source 3-1 is turned on, the pattern 51 and a portion of the pattern 52 appear illuminated; when the light source 3-2 is turned on, the pattern 52, the pattern 51 and a portion of the pattern 53 appear illuminated. Similarly, when the light source 3-3 is turned on, the pattern 53, and the pattern 52 and a portion of the pattern 54 appear illuminated.

Thus, in this modification example, the display device allows a pattern to appear to overlap as the pattern changes when illuminated.

Figure 11A:
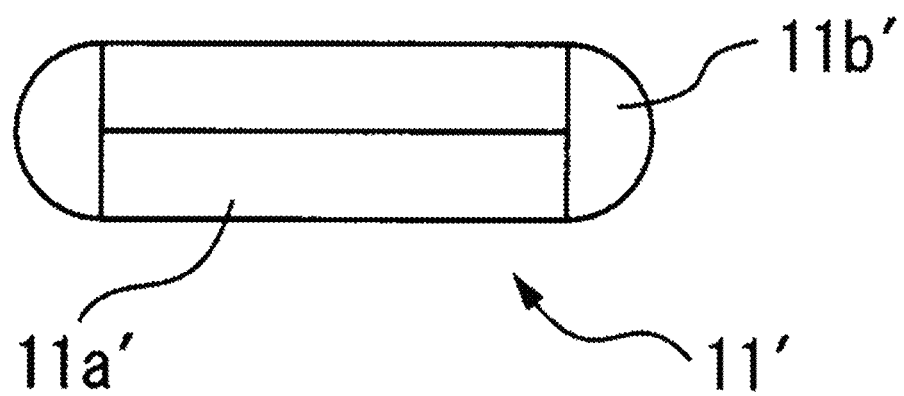
FIG. 11A is a schematic plan view illustrating a prism that may be employed in a modification example, such as in FIG. 9.
Figure 11B:
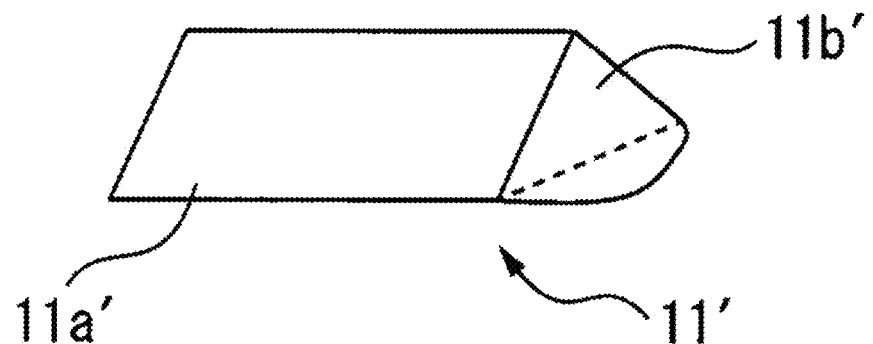
FIG. 11B is a schematic perspective view of illustrating a prism that may be employed in a modification example, such as in FIG. 9.

FIG. 11A is a schematic plan view illustrating a prism that may be employed in the modification example in FIG. 9; and FIG. 11B is a schematic perspective view of a prism that may be employed in the modification example in FIG. 9. As with the prisms 11 from one or more embodiments, in this modification example the prisms 11' are a roughly triangular grooves of a predetermined length on the diffusion surface 2b with one surface of the prism serving as a reflection surface 11a'. A side surface 11b' of the prism 11' is oriented outward from the reflection surface 11a' thereby forming a spherical projection. As a result, the side surface 11b' reflects not only light from the light source facing the reflection surface 11a' but also light from a light source adjacent to the corresponding light source; the side surface 11b' reflects light toward the observer via the emission surface 2c.

Further, in this modification example the reflection surface of the prisms forming a given pattern among the plurality of patterns may be oriented between two adjacent light sources. Hereby, a given pattern appears illuminated when only one of the two adjacent light sources is turned on. As a result, the controller 5 turns on the plurality of light sources in the sequence the light sources are aligned thereby allowing the display device to cause a portion of the illuminated pattern to appear overlapped as the pattern changes similarly to the above-mentioned modification example.

In another possible modification, the distribution density or the size of the prisms making up a pattern may be different for each pattern. Hereby, the display device is able to vary the brightness of a pattern in accordance with the pattern being presented.

Figure 12:
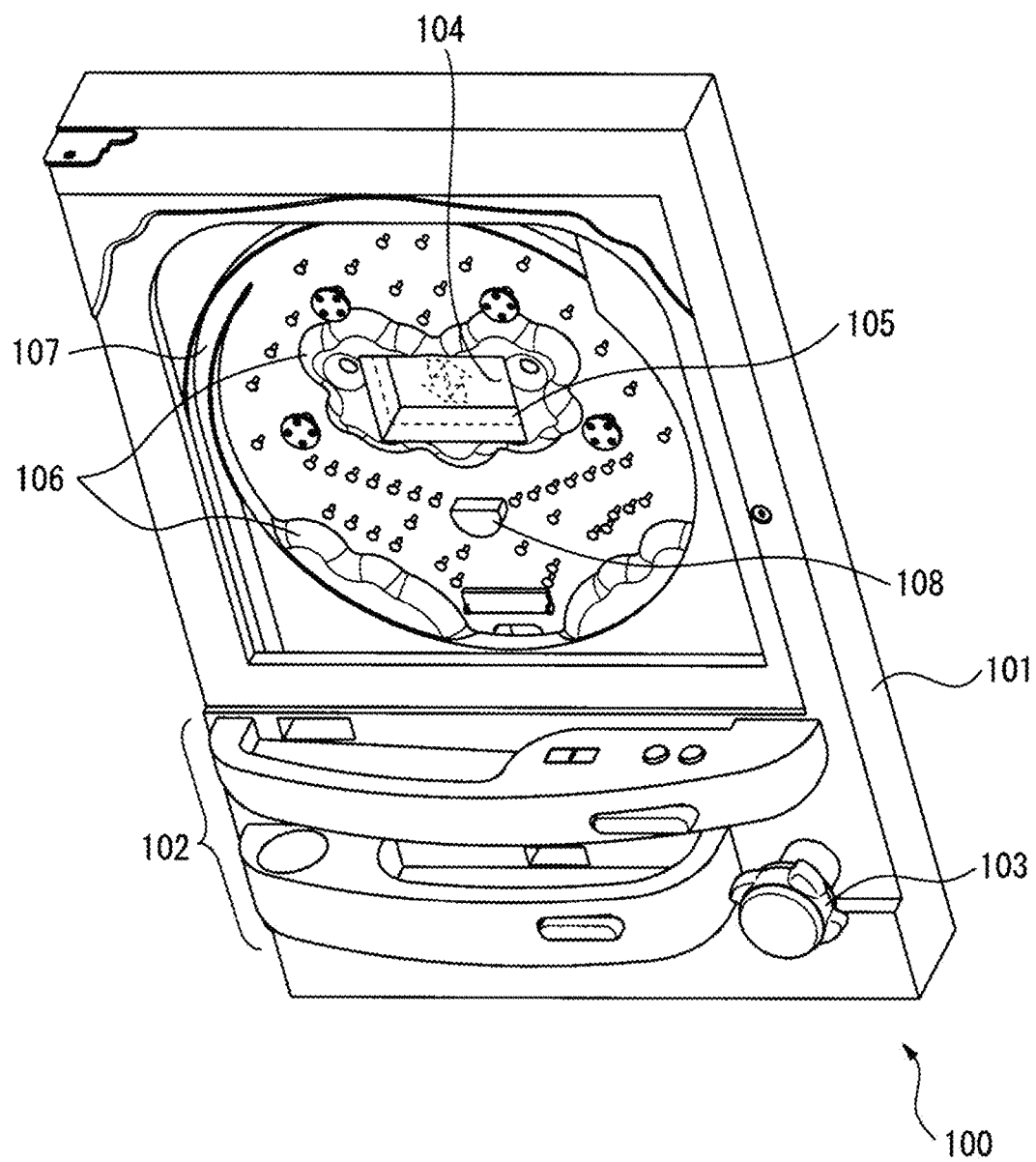
FIG. 12 is a diagram illustrating a schematic perspective view, i.e., a user view of pinball game machine including a display device according to one or more embodiments or modification examples.

A display device according to any of one or more embodiments or modification examples may be mounted in a game machine such as pinball machine or a slot machine. FIG. 12 is a schematic perspective view, i.e., a user view of pinball game machine including a display device according to one or more embodiments or modification examples. As illustrated in FIG. 12, a pinball machine 100 includes a playfield 101 which is the main game unit. The playfield 101 is where play takes place and takes up a majority of the machine, from the top portion to the center. The pinball machine 100 also includes a ball trough 102 arranged below the playfield 101, an operation portion 103 provided with a jog; a liquid crystal display provided at roughly the center of the playfield 101; and a display device 105 disposed on the front surface of the liquid crystal display 104.

To aid in presentation of the game, the pinball machine 100 includes targets 106 arranged on the front surface of the playfield 101, at the lower part thereof and surrounding the display device 105. The playfield 101 includes rails 107 positioned at the sides. The playfield 101 may also include multiple obstacle pins (not shown) and at least one prize target 108.

The input unit 103 launches the pinball at a predetermined force via a launcher (not shown) in accordance with the amount of rotation of the jog by a player. A launched pinball travels upward along the rails 107 and falls between the multiple obstacle pins. When a sensor (not shown) detects that a pinball has entered any of the prize targets 108, a main controller (not shown) provided on the rear side of the playfield 101 pays out a predetermined number of pinballs depending on the prize into the ball trough 102 via a payout device (not shown). The main controller also drives the liquid crystal display 104 and the display device 105 via a presentation CPU (not shown) provided on the rear side of the playfield 101. The presentation CPU transmits a control signal to the display device 105 which includes lighting sequence information responsive to the state of play.

The display device 105 is merely one example of a display device according to one or more embodiments and modification examples; this display device 105 may be attached to the playfield 101 so that the output surface of the light guide plate is oriented toward the player. Furthermore, in this example, the shape of the targets 106 surrounding the display device 105 may limit the light sources to being placed along one side at the top of the display device 105; therefore, the display device 105 can be installed so that the light sources of the display device 105 are located along the top. The controller in the display device 105 may change the sequence of illuminating the light sources in accordance with the lighting sequence information included in the control signal from the presentation CPU. Hereby, the player is able to view an image presented on the liquid crystal display 104 and a dynamically changing pattern changing according to the illumination of the light sources. Alternatively, the controller may turn off the light source so that the observer may view only the image presented on the liquid crystal display 104 via the light guide plate.

A person having ordinary skill in the art may make various modifications in the above manner within the scope of the invention in accordance with how the device will be used.

The invention claimed is:

1. A display device comprising:
a light guide plate formed from a panel transparent to visible light, the light guide plate configured to present a plurality of patterns;
a plurality of light sources aligned along one sidewall of the light guide plate with each light source corresponding to a pattern among the plurality of patterns;
a storage unit configured to store lighting sequence information that specifies a sequence for turning on the plurality of light sources; and
a controller configured to control the turning on and off of the plurality of light sources in accordance with the lighting sequence information, wherein:
the light guide plate comprises an incidence surface comprising the one sidewall facing the plurality of light sources and configured to allow visible light emitted from the light sources to enter the light guide plate;
each one of the plurality of patterns comprises a plurality of prisms arranged on one surface of the light guide plate such that the plurality of prisms reflect only the visible light emitted from one of the plurality of light sources corresponding to the pattern toward an emission surface of the light guide plate; and the emission surface comprises a surface of the light guide plate opposite the plurality of prisms.

2. The display device according to claim 1 further comprising:
a plurality of first prisms forming a first pattern among the plurality of patterns; and
a plurality of second prisms forming a second pattern among the plurality of patterns, wherein
each of the plurality of first prisms comprises a reflection surface oriented facing a first light source from the plurality of light sources that corresponds to the first pattern, and
each of the plurality of second prisms comprises a reflection surface oriented facing a second light source from the plurality of light sources that corresponds to the second pattern.

3. The display device according to claim 1, wherein:
the lighting sequence information specifies the sequence for turning on the plurality of light sources so that a number of light sources simultaneously illuminated changes as time passes; and
the controller changes the number of light sources simultaneously turned on in accordance with the passage of time according to the lighting sequence information.

4. The display device according to claim 2, wherein:
the lighting sequence information specifies the sequence for turning on the plurality of light sources so that a number of light sources simultaneously illuminated changes as time passes; and
the controller changes the number of light sources simultaneously turned on in accordance with the passage of time according to the lighting sequence information.

5. The display device according to claim 1, wherein:
the plurality of light sources comprises a first light source that corresponds to a first pattern among the plurality of patterns and a second light source that corresponds to a second pattern among the plurality of patterns;
the plurality of prisms comprises: a plurality of first prisms forming the first pattern and reflecting the visible light from the first light source toward the emission surface; and a plurality of second prisms forming the second pattern and reflecting the visible light from the second light source toward the emission surface; and
the plurality of light sources comprises a third light source that corresponds to a third pattern among the plurality of patterns and is adjacent to the second pattern; and
the plurality of second prisms forming the second pattern reflects the visible light from second light source and visible light from the third light source toward the emission surface.

6. The display device according to claim 5, wherein the lighting sequence information specifies that the first light source, the second light source, and the third light source are turned on in that order.

7. A game machine comprising:
a main game unit; and
a display device provided on a surface of the main game unit facing a player, wherein the display device comprises:
a light guide plate formed from a panel transparent to visible light, the light guide plate configured to present a plurality of patterns;
a plurality of light sources aligned along one sidewall of the light guide plate with each light source corresponding to a pattern among the plurality of patterns;
a storage unit configured to store lighting sequence information that specifies a sequence for turning on the plurality of light sources; and
a controller configured to control the turning on and off of the plurality of light sources in accordance with the lighting sequence information, wherein:
the light guide plate comprises an incidence surface comprising the one sidewall facing the plurality of light sources and configured to allow visible light emitted from the light sources to enter the light guide plate; and
each one of the plurality of patterns comprises a plurality of prisms arranged on one surface of the light guide plate such that the plurality of prisms reflect only the visible light emitted from one of the plurality of light sources corresponding to the pattern toward an emission surface of the light guide plate, wherein the emission surface comprises a surface of the light guide plate opposite the plurality of prisms.

\* \* \* \* \*